May 26, 1953 J. D. TENNISON, JR 2,639,680
COUPLING FOR JOINING LENGTHS OF TROUGH GUTTERS
Filed June 18, 1949 3 Sheets-Sheet 1
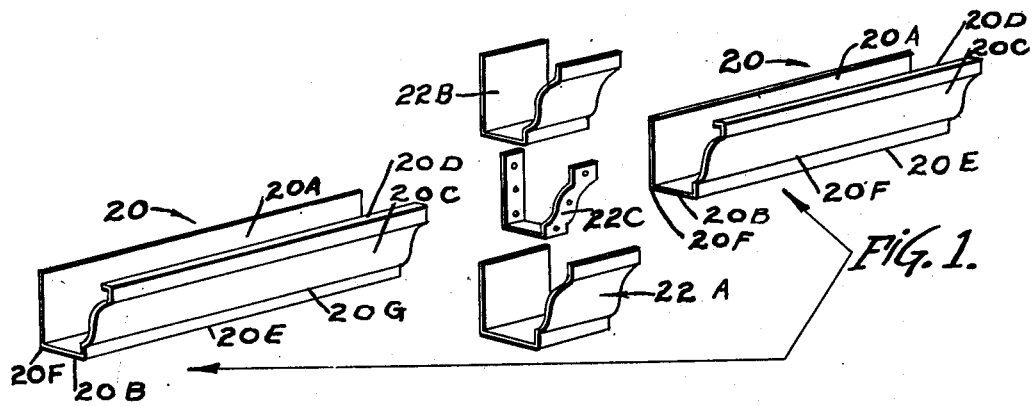
Fig. 1.
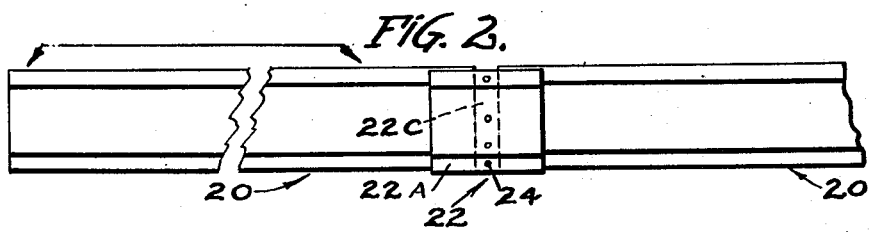
Fig. 2.
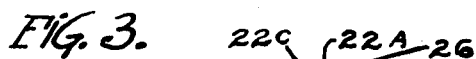
Fig. 3.
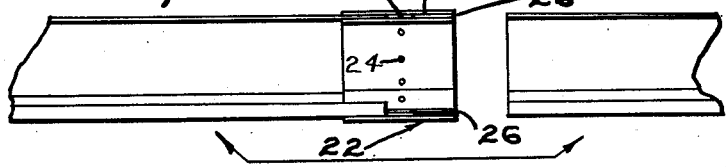
Fig. 4.
Fig. 5.
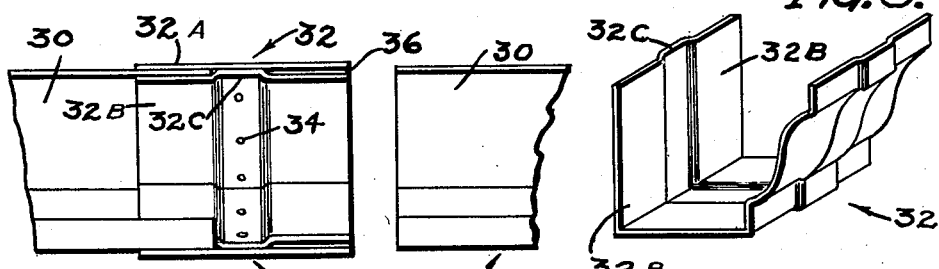
Fig. 6.
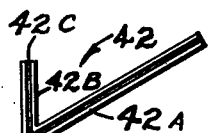
Fig. 7.
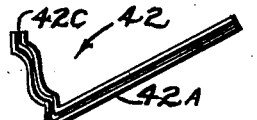
Fig. 8.
Inventor
JAMES D. TENNISON JR.
By Weatherford & Weatherford
Attorneys
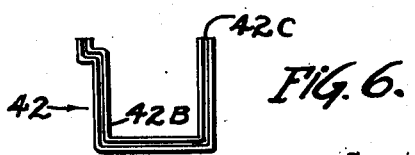

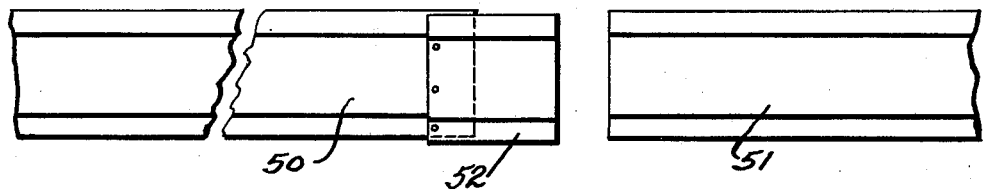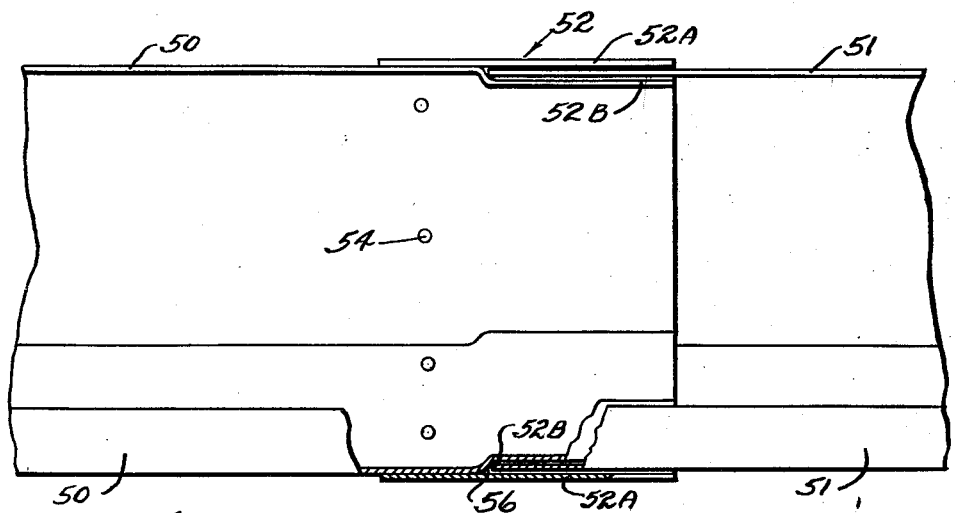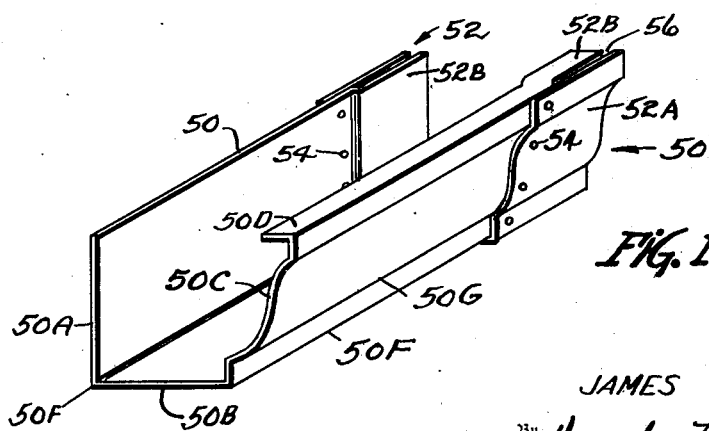

May 26, 1953   J. D. TENNISON, JR   2,639,680
COUPLING FOR JOINING LENGTHS OF TROUGH GUTTERS
Filed June 18, 1949   3 Sheets-Sheet 3
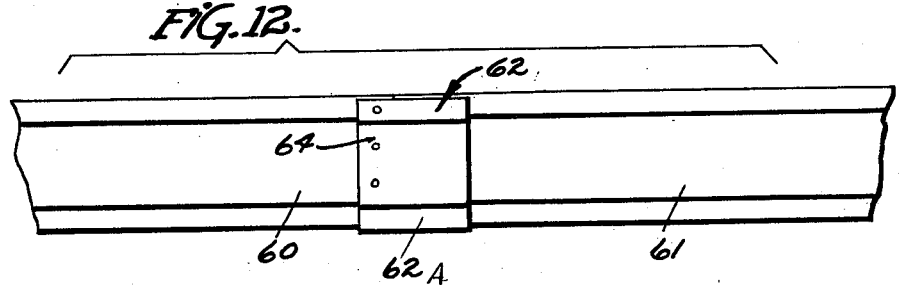
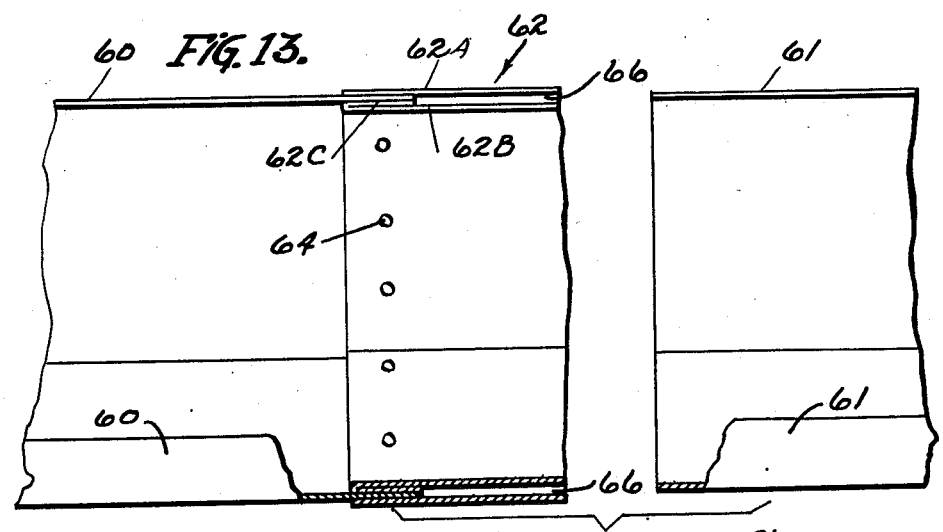
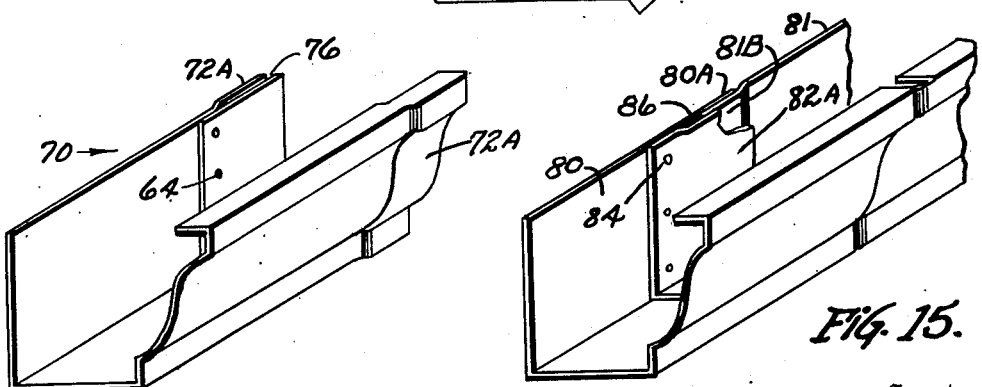
Inventor
JAMES D. TENNISON JR.
By Weatherford & Weatherford
Attorneys Patented May 26, 1953

2,639,680

UNITED STATES PATENT OFFICE 2,639,680

COUPLING FOR JOINING LENGTHS OF TROUGH GUTTERS

James D. Tennison, Jr., Memphis, Tenn.

Application June 18, 1949, Serial No. 100,068

6 Claims. (Cl. 108—28)

This invention relates to sheet metal slip joints for joining lengths of trough or other eave gutters and particularly relates to gutters which, in cross section are angularly bent with sharply defined corners.

Trough gutters are ordinarily of half circle cross section, or of rectangular cross section with a flat horizontal bottom and back and front walls bent at right angles thereto and extending upward therefrom, the front wall often being outwardly bent, and arcuately curved upwardly and reversely outwardly in well known ogee pattern, to the latter of which cross sections the present invention primarily relates.

Slip joints have heretofore been known for gutters of half circle or other arcuate cross section, but attempts to couple lengths of rectangular or ogee gutters having sharp angular bends in cross section have proven failures by reason of constriction of the couplings at the sharp angular bends, necessarily made in the couplings to conform them to the like bends of the gutter cross section.

The objects of the invention are:

To provide couplings of sheet metal which will effectually couple gutter lengths with a minimum of interference with flow and are of simple and efficient design.

To provide couplings of sheet metal, angularly bent in cross section, which will aline, bridge between, and couple together the proximate ends of lengths of sheet metal gutter of the same cross section, which couplings are free from constriction at such bends, and receive and nest said gutter ends.

To provide couplings of sheet metal, angularly bent in cross section which are free from constriction at such bends and are adapted to nest the proximate ends of contiguous length of sheet metal gutter of similar cross section and aline, couple, and bridge between such ends.

The means by which the foregoing and other objects are accomplished and the method of their accomplishment will readily be understood from the following specifications or reference to the accompanying drawings in which:

Fig. 1 is an oblique view of two gutter lengths of ogee section, and therebetween three parts which assembled will make up a coupling for the gutter lengths.

Fig. 2 is a side elevational view of the assembled coupling with the gutter lengths engaged, and Fig. 3 a corresponding plan view with one gutter length engaged with the coupling and the other alined for engagement.

Fig. 4 is an enlarged plan view of ogee gutter lengths and a modified two piece coupling therefor, one of the lengths being engaged and the other disengaged.

Fig. 5 is an oblique projection of the inner member of the two piece coupling of Fig. 4.

Fig. 6 is an end elevation of a coupling for a rectangular gutter, the coupling being of either the three piece type shown in Figs. 1, 2, and 3, or the two piece type shown in Figs. 4 and 5.

Figs. 7 and 8 are end elevations of couplings of either construction for roof edge gutters.

Figs. 9, 10, and 11 show a modification in which the inner member of the coupling is an offset portion of one of the gutter lengths.

Fig. 9, being a side elevational view in which one part of the coupling is an inwardly offset portion of one of the gutter lengths which offset portion cooperates with a longitudinal outer member to slidably receive and house the end portion of the other gutter length, which is shown detached in the view;

Fig. 10 is a relatively enlarged plan view showing the gutter lengths coupled, with a fragmentary portion of each shown in section and, Fig. 11 is an oblique projection of the coupling end of the gutter length which carries the offset inner coupling member.

Fig. 12 is a side elevational view of a further modification showing portions of gutter lengths, and a coupling therefor, the inner member of the coupling being modified to increase the socket space, and together with an outer coupling member being attached to one of the gutter lengths and, Fig. 13, a relatively much enlarged plan view of the gutter lengths uncoupled with engaging portions of the two lengths, partially in section;

Fig. 14 is an oblique view of a modified form of the coupling end of the gutter length shown in Fig. 10, in which modification the inner member of the coupling is longitudinally straight and the end portion of the gutter is outwardly offset to form the outer member and provide the socket of the coupling.

Fig. 15 is an oblique view of a further modified form of coupling in which modification the inner member of the coupling is inwardly offset and is attached to and cooperates with a straight end portion of one gutter length to form a coupling socket to receive an offset end portion of another gutter length.

Referring now to the drawings in which the various parts are indicated by numerals, 20 are lengths of gutters which are to be coupled together, these gutter lengths each being formed from sheet metal, usually tinned or galvanized, and comprising a vertical back portion 20A, a bottom portion 20B, a front 20C, here shown as of ornamental ogee cross section, and an inwardly extending flange 20D, which portions are respectively sharply bent with respect the one to the other, establishing abrupt corners, as the corner 20E, the ogee front having a reentrant corner 20F.

The gutter lengths are joined by couplings 22, shown in Figs. 2 and 8, which, as shown in Fig. 1, comprise three parts, an outer member 22A, an inner member 22B and a much shorter spacer means 22C, all of sheet metal, the inner and outer members preferably being of the same thickness as the gutter lengths and the spacer means of equal or slightly greater thickness, the outer member 22A internally conforming in cross section to the exterior of the gutter, the inner member 22B externally conforming to the interior of the gutter, and the spacer member 22C to the cross section of the gutter.

The parts are assembled with the spacer means between the outer and inner members at the mid point of their lengths and the two members and the spacer means are securely and rigidly united into a rigid coupling 22, as by rivets or spot welds 24. In the thus formed coupling the spacing means maintains the spacing of the interior and exterior members, particularly at the crucial angle portions of these members and insure sockets 26 for the reception of end portions of the to-be-joined gutter lengths 20.

In use the end portions of the gutter lengths are inserted in the sockets 23 between the outer and inner members 22A, 22B of the coupling and pushed into end engagement with the spacer means 22C thereof. The joint may be sealed by soldering the inner member, and if desired the outer member also, to the gutter lengths.

In Fig. 4, the gutter lengths 30 are joined by a coupling 32 which includes an outer member 32A and an inner member 32B, both of sheet metal, preferably of the same thickness as the gutter metal.

Midway its length a belt-like portion 32C of one of the members is offset in the amount of the thickness of the gutter, or slightly in excess of such thickness, toward the other thereof, such portion 32C being shown in Figs. 4 and 5 as outwardly offset from the body of the inner member 32B and serving as means to space the end portions of the members 32A and 32B from their ends inward to the belt 32C to form oppositely faced sockets 36 in which the end portion of one of the gutter lengths is shown nested with the other length alined for engagement.

With the members 32A and 32B assembled the belt 32C is secured to the outer members 32A by rivets or spot welds 34 as the three corresponding members were secured in Figs. 2 and 3.

In Figs. 6, 7 and 8, couplings similar one to the other, except as to cross sectional configuration, each comprise an outer member 42A, an inner member 42B, and spacer means 42C, which may be an individual piece, as the spacer 22C of Figs. 1, 2 and 3, or an offset belt portion of one of the members as the belt 32C of Figs. 4 and 5, and spaces the end portions of the members apart to form sockets corresponding to the sockets 26 and 36 heretofore mentioned.

In Figs. 9, 10, and 11, gutter lengths 50, 51 are joined by couplings 52 which comprise an outer member 52A, and an inner member 52B formed by inwardly offsetting an end portion of the gutter length to form with the outer member a socket 56 for the reception of the undeformed end of the section 51. The outer member 52A is secured to the gutter length by rivets or spot welds 54. Each length of the gutter has one undeformed end and one socket end. The offset of the deformed end of the gutter is equal to or slightly in excess of the thickness of the gutter metal. The lengths are united by engaging the undeformed end of one gutter length in the socket end of the other and pushing the engaged end to a seat against the bottom of the socket. Sealing may be accomplished by soldering the end of the inner member to the inserted gutter length.

In Figs. 12 and 13, gutter lengths 60 and 61 are joined by a coupling 62 which includes outer and inner members 62A, 62B which are both rigidly attached as by rivets or spot welds 64 respectively to the inner and outer surfaces of an end portion of one length as the length 60, and project therebeyond to form a socket 66, to receive a plain end portion of the other length 61, the two gutter lengths being shown engaged in Fig. 12 and alined for engagement in Fig. 13. Both members are sheet metal, bent and folded to conform to the cross section of the gutters. Each of the gutter lengths is provided with a socket.

In some cases to increase the socket space the attaching end 62C of one of the coupling members, as the inner member 62, is folded back upon itself, the folding being outward and backward on the inner member, as shown, or inward and backward should the outer member be folded.

As heretofore the plain end of one gutter length is inserted in the socket 64 of the other length and is pushed to a seat.

The joint may be sealed by soldering the member 62B to both the gutter lengths 60 and 61.

In Fig. 14 a gutter length 70 is shown which is offset at one end to form a member 72A of a coupling 72 as is the gutter length 50 of Figs. 9, 10, and 11 offset except that the offset of those figures is inward and forms the inner member 52B of the coupling 52, whereas the offset in Fig. 14 is outward and forms the outer coupling member 72A and the inner member 72B is longitudinally straight and is attached to the inner surface of the gutter length. The offset members are each an integral portion of one end of each of the gutter lengths and cooperate each with a straight portion to form a socket 76 for the reception of the opposite end of another gutter length.

Fig. 15 shows coupled end portions of gutter lengths 80 and 81, each of which had one straight and one offset end portion.

Cooperating with the straight end portion 80A of the gutter length 80 is a coupling member 82A which is here shown as secured against the inner surface of the end portion as by rivets or spot welds 84 and away therefrom offsets laterally inward to form a socket 86 to receive an end portion 81B of the other gutter length 81, this latter end portion being inwardly offset in the amount of the thickness of the gutter material to nest within the gutter end portion and in the socket 86.

It will be understood however, that the end portion 81B might as readily be outwardly offset as is the coupling member 72A of the Fig. 14, but in less amount in which case the gutter end portion 80A would nest in the offset end, and the offset coupling member 82A would be offset outward and be secured on the outside of the straight gutter end portion 80A.

I claim:
1. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally substantially the thickness of the metal with respect to the opposed extremity of the other length, said joint including a rigid transverse member of complementary cross-sectional configuration fixedly secured to one of said lengths in face to face relationship spaced from an extremity thereof, a free edge of said transverse member being spaced from the adjacent extremity of the length to which said member is secured to provide a socket for the reception of the end portion of the other of said lengths.

2. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally the thickness of the metal with respect to the opposed extremity of the other length, said joint including a rigid transverse member of complementary cross-sectional configuration positioned exteriorly of one of said lengths and fixedly secured thereto in face to face relationship spaced from an extremity thereof, a free edge of said transverse member being spaced from the adjacent extremity of the length to which said member is secured to provide a socket for the reception of the end portion of the other of said lengths.

3. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally the thickness of the metal with respect to the opposed extremity of the other length, said joint including a rigid transverse member of complementary cross-sectional configuration positioned interiorly of one of said lengths adjacent an extremity thereof and fixedly secured thereto in face to face relationship at a point removed from the extremity thereof, a free edge of said transverse member being spaced from the adjacent extremity of the length to which said member is secured to provide a socket for the reception of the end portion of the other of said lengths.

4. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally the thickness of the metal with respect to the opposed extremity of the other length, said joint including a rigid transverse member of complementary cross-sectional configuration positioned interiorly of one of said lengths adjacent an extremity thereof and having one edge fixedly secured thereto in face to face relationship at a point removed from the extremity thereof, the free edge of said transverse member being spaced from the adjacent extremity of the length to which said member is secured to provide a socket for the reception of the end portion of the other of said lengths.

5. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally the thickness of the metal with respect to the opposed extremity of the other length, said joint including a rigid transverse member of complementary cross-sectional configuration positioned interiorly of the length provided with said laterally offset extremity and fixedly secured to said length in face to face relationship spaced from the offset extremity thereof, a free edge of said transverse member being spaced from said offset extremity to provide a socket for the reception of the end portion of the adjacent length.

6. A joint for detachably connecting two lengths of sheet metal gutter in contiguous relation, said lengths having a substantially flat bottom and substantially flat side walls making abrupt angles with said bottom, said lengths being of identical cross-sectional configuration and the extremity of one length being offset laterally the thickness of the metal with respect to the opposed extremity of the other length, said joint including a rigid transverse member of complementary cross-sectional configuration positioned interiorly of said other length adjacent an extremity thereof and fixedly secured thereto in face to face relationship at a point removed from the extremity thereof, a free edge of said transverse member being spaced from the adjacent extremity of the length to which said member is secured to provide a socket for the reception of the laterally offset extremity of the adjacent length.

JAMES D. TENNISON, Jr.

References Cited in the file of this patent

UNITED STATES PATENTS

| Number | Name | Date |
|---|---|---|
| 168,934 | Stearns | Oct. 19, 1875 |
| 173,037 | Miller | Feb. 1, 1876 |
| 180,416 | Clow | Aug. 1, 1876 |
| 326,647 | Hardy | Sept. 22, 1885 |
| 468,298 | White et al. | Feb. 2, 1892 |
| 497,466 | Davidson | May 16, 1893 |
| 1,087,325 | Schlafly | Feb. 17, 1914 |
| 1,126,854 | Peterson | Feb. 2, 1915 |
| 1,301,565 | Jacobs | Apr. 22, 1919 |
| 1,460,733 | Rigby | July 3, 1923 |
| 1,682,840 | Foerch, Jr. | Sept. 4, 1928 |
| 2,360,159 | Peck | Oct. 10, 1944 |